(12) United States Patent
Black

(10) Patent No.: US 6,340,105 B1
(45) Date of Patent: Jan. 22, 2002

(54) PORTABLE CYLINDER CARRIER ARRANGEMENT

(76) Inventor: James C. Black, 25490 Jim Dr., Moreno Valley, CA (US) 92553

( * ) Notice: Subject to any disclaimer, the term of this patent is extended or adjusted under 35 U.S.C. 154(b) by 0 days.

(21) Appl. No.: 09/344,515

(22) Filed: Jun. 25, 1999

(51) Int. Cl.$^7$ ................................................. B60R 9/00
(52) U.S. Cl. .................. 224/404; 224/328; 211/85.18; 248/500
(58) Field of Search ............................... 224/328, 404, 224/539; 248/500, 505, 313, 346.01, 346.03; 211/85.18; 410/36, 41; 220/737, 4.21, 481

(56) References Cited

U.S. PATENT DOCUMENTS

| | | | |
|---|---|---|---|
| 3,165,206 A | * | 1/1965 | Taylor |
| 3,201,186 A | * | 8/1965 | Noonan et al. ......... 224/328 X |
| 3,732,843 A | * | 5/1973 | Pappas et al. |
| 4,173,965 A | * | 11/1979 | Vallee et al. ................. 224/328 |
| 4,406,387 A | * | 9/1983 | Rasor .......................... 224/328 |
| 4,573,731 A | * | 3/1986 | Knaack et al. .......... 224/404 X |
| 4,770,428 A | * | 9/1988 | Sugiyama |
| 4,974,766 A | * | 12/1990 | DiPalma et al. ............ 224/328 |
| 5,040,933 A | * | 8/1991 | Lee et al. |
| 5,316,178 A | * | 5/1994 | Garber, Jr. ............... 220/481 X |

FOREIGN PATENT DOCUMENTS

| | | | | |
|---|---|---|---|---|
| CA | 1106809 | * | 8/1981 | ................. 224/328 |

* cited by examiner

Primary Examiner—Gregory M. Vidovich
(74) Attorney, Agent, or Firm—Raymond Y. Chan; A. Justin Lum; David and Raymond Patent Group

(57) ABSTRACT

A portable cylinder carrier arrangement for holding at least one gas cylinder to a storing surface for storing or transporting, includes a supporter device firmly affixed on a storing surface for storing or transporting, at least a carrier shell forming at least a receiving cavity for holding a gas cylinder therein, a restraining device for securing said gas cylinder in position inside said receiving cavity of said carrier shell, and a mounting seat for securing said carrier shell to said supporter device. The portable cylinder carrier is adapted for the secure transport and storage of fire extinguishers or cylindrical gas cylinders, allowing for the carrier to be easily moved from a mounted storage position to a mounted transport position.

40 Claims, 7 Drawing Sheets

PORTABLE CYLINDER CARRIER ARRANGEMENT

FIELD OF THE PRESENT INVENTION

The present invention relates to a cylinder carrier, and more particularly to a portable cylinder carrier arrangement for gas cylinders such as mixed gas cylinders, compressed air cylinders, oxygen cylinders, $CO_2$ cylinders, and acetylene cylinders. The present invention provides a method for safer and more orderly storage and transport of such cylinders by compartmentalizing such cylinders during transportation and storage within said carrier.

BACKGROUND OF THE PRESENT INVENTION

In today's society, as Americans desire more leisure time and wish to spend their leisure time leading an active lifestyle, one such outlet is diving. This sport attracts more people every year. In addition, there is more exploration of the seas for both research and commerce. Not only are more people diving, but more often, and for longer periods of time. Commensurate with this increased activity is an increased use of compressed air cylinders for these dives. This corresponds to a need for a safer and more organized method of storage and transport for these cylinders.

Gas cylinders are not limited to holding compressed air, but may hold other gases, such as oxygen nitrous oxide, or acetylene, for example. Up to now, there is no uniform method for storing, or transporting as cylinders of often, volatile or compressed gases. Presently, businesses or individuals often store these cylinders by simply standing them next to each other. This lends them susceptible to being knocked over by an errant vehicle, or clumsy individual. Even cordoning them off with ropes may not be adequate to keep them from toppling if nudged.

Alternatively, these cylinders are often placed on top of each other, horizontally, and kept from rolling away by using some sort of barriers to keep them bunched up together. This method may lead to a disorganized jumble of cylinders.

In particular, for private use, individuals often store these cylinders in their homes or garages. The cylinders are often located in areas that are reachable by small children, or may be jarred by a car, or the toppling of other items. The danger is a risk of damage to not only the cylinder itself, but also to other property or people should the cylinder fall on anything, or the cylinder valve pops off.

Not only are current storage methods dangerous, but also present modes of transporting the compressed gas cylinders are dangerous. For companies that use many cylinders, for acetylene torching, for example, the cylinders may be stacked in trucks, horizontally or vertically. Individuals, such as divers, may have cylinders rolling around in the trunks of their cars or the flatbeds of their trucks. In either case, such transportation increases the risk of a cylinder rupture in the case of an accident, or from jostling, also increasing the risk that the top of the cylinder will shoot off in any direction from the resulting explosion of compressed air.

In the market for our carriers, there are few, if any, carriers or other restraints that accomplish the goals of safety and orderly storage and transport of such gas cylinders, while avoiding removal of the cylinders from the carrier. The existing methods are inadequate for bulk transpiration or storage of cylinders.

For examples, U.S. Pat. Nos. 4,060,174 and 4,391,377 disclose the major prior arts of the portable cylinder carrier.

U.S. Pat. No. 4,060,174 discloses rectangular boxes for holding oxygen cylinders individually. Each box holds one oxygen cylinder. It is comprised of four panels of equivalent size, and a top flap and a bottom flap. Inside is a tray upon which the cylinder may rest if the container is in a horizontal position. The container may be fixed together by attaching brackets and may be stacked or aligned in box like formations or side by side if desired. The box lacks any anchor or other mounting system to prevent it from sliding around during transport, or to affix the box in a storage area. Rather, the key supposed advantage of the box is the ability to stack them, with the boxes resting in a horizontal position.

In addition, each box requires assembly by the consumer, to attach the shells together require further assembly by the consumer of the box.

U.S. Pat. No. 4,391,377 discloses a transport container. The self-contained double tubular transport container of this patent suspends two cylinders between two end pieces, then allows for the double container to be mounted to another double container via welded T-frames. The containers are attached side by side and may lay completely horizontal, or vertical. The purpose of the assembly is to relive the stress on cylinders by suspending the cylinders during storage. This invention is inferior to that of the present invention in that the cylinders must be mounted and screwed into place in order for the entire assembly to be transportable, requiring additional time to prepare the entire assembly for transportation. In addition, no provision is made to attach the assembly to the means for transportation, or to anything else when the container might be stored. Lastly, this storage method does not efficiently use space, sacrificing such efficiency of use in favor of reducing stress on a cylinder.

SUMMARY OF THE PRESENT INVENTION

The main object of the present invention is to provide a portable cylinder carrier arrangement for the secure transport and storage of fire extinguishers or cylindrical gas cylinders, allowing for the carrier to be easily moved from a mounted storage position to a mounted transport position.

Another object of the present invention is to provide a portable cylinder carrier arrangement which is easy to assemble, easy to mount, and easy to use.

Another object of the present invention is to provide a portable cylinder carrier arrangement that secures at least one cylinder to the base of a transport vehicle to prevent the cylinder from rolling around in the vehicle.

Another object of the present invention is to provide a portable cylinder carrier arrangement that may be used to orderly stack cylinders for storage while preventing sliding, or rolling of the cylinders.

Another object of the present invention is to provide a portable cylinder carrier arrangement which may be mounted, putting the cylinder filled carrier out of the way of people, and other objects which may cause damage to the cylinders, or create an accident by popping the valves of the cylinders.

In order to accomplish the above objects, the present invention provides a portable cylinder carrier arrangement for safely storing and transporting at least one gas cylinder. The portable cylinder carrier comprises a storing apparatus affixed on a storage surface; a carrier seat having at least one receiving chamber therein for holding a gas cylinder; a restraining means for securing said gas cylinder in the receiving chamber of the carrier seat; and a securing means for securing the carrier seat to the storing apparatus.

Accordingly, the present invention requires very little assembly. The invention does not contain an excessive number of parts. In addition, the present invention may be mounted without removal of the cylinders inside, thereby allowing greater stability when transporting, greater use of space when storing, and greater ease when moving the cylinders from place to place. One may simply pick up the container filled portable cylinder carrier from its storage place, and attach it to brackets located in the trunk of a vehicle or in the back of a pickup truck, or the back or side of a boat, etc., for quick and easy transport.

The portable cylinder carrier of the present invention is a low cost, detachable carrier that can be quickly mounted and removed from any transport vehicle, or storage location, without removing the cylinder or cylinders from the carrier. The cylinders themselves may also be placed into, or easily removed from the carrier without moving the carrier. Placement and removal is therefore faster and more efficient. The owner has the option of stacking the carriers, or mounting them for secure transport, or safe storage away from any children or other items. This product provides a long felt need in the market for a detachable, mountable portable cylinder carrier, usable by the average person without complicated construction or complicated directions for use.

DETAILED DESCRIPTION OF THE PREFERRED EMBODIMENT

Figure 1:
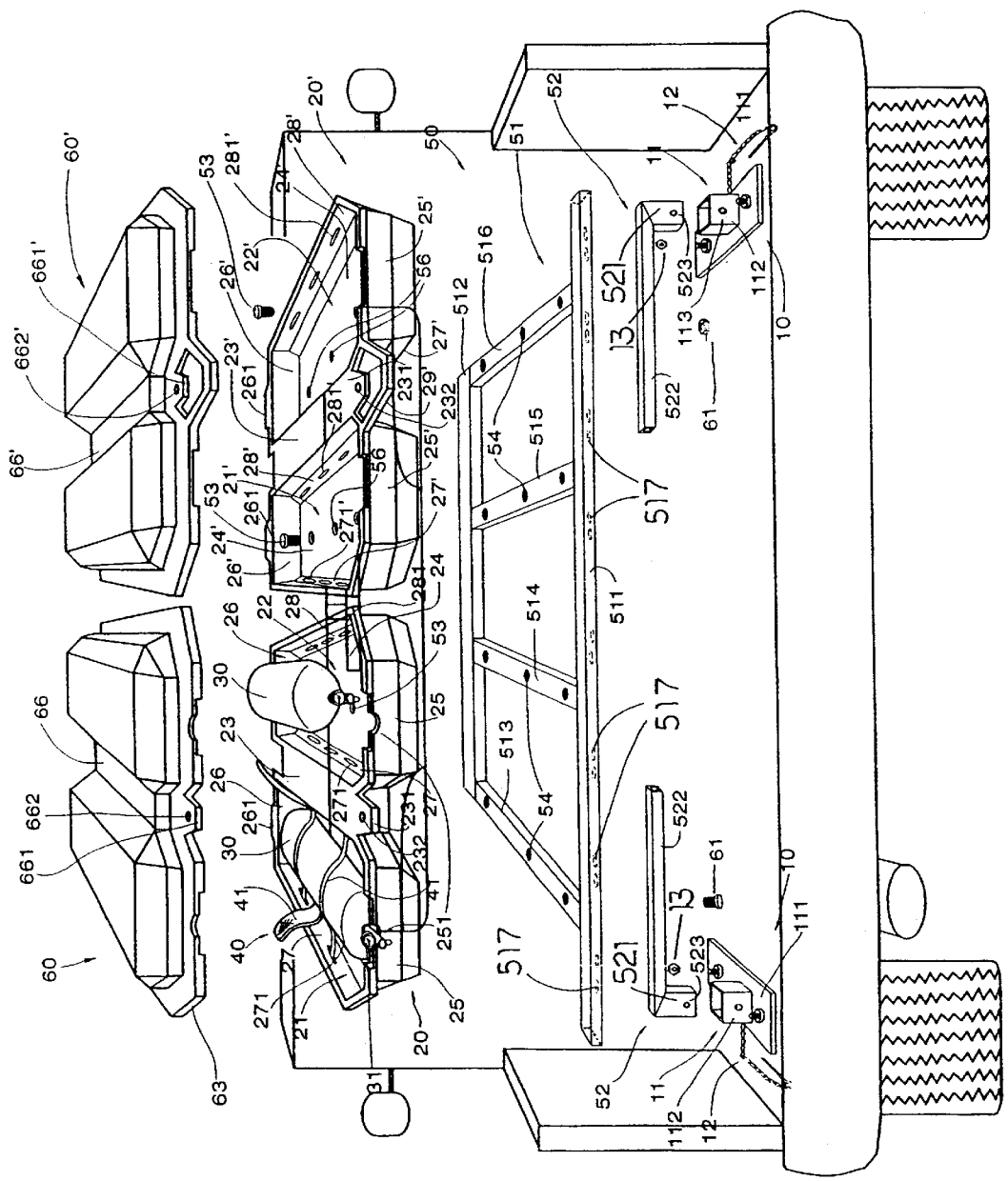
FIG. 1 is an exploded perspective view of a portable cylinder carrier arrangement according to a preferred embodiment of the present invention.

Referring to FIG. 1 of the drawings, a portable cylinder carrier arrangement of the present invention provided for holding at least one gas cylinder to a storing surface for storing or transportation is illustrated. The portable cylinder carrier arrangement comprises a supporter means 10 firmly affixed on a storing surface for storing or transporting, at least a carrier shell 20 forming at least a receiving cavity 21 for holding a gas cylinder 30 therein, a restraining means 40 for securing the gas cylinder 30 in position inside the receiving cavity 21 of the carrier shell 20, and a mounting seat 50 for securing the carrier shell 20 to the supporter means 10.

Figure 2:
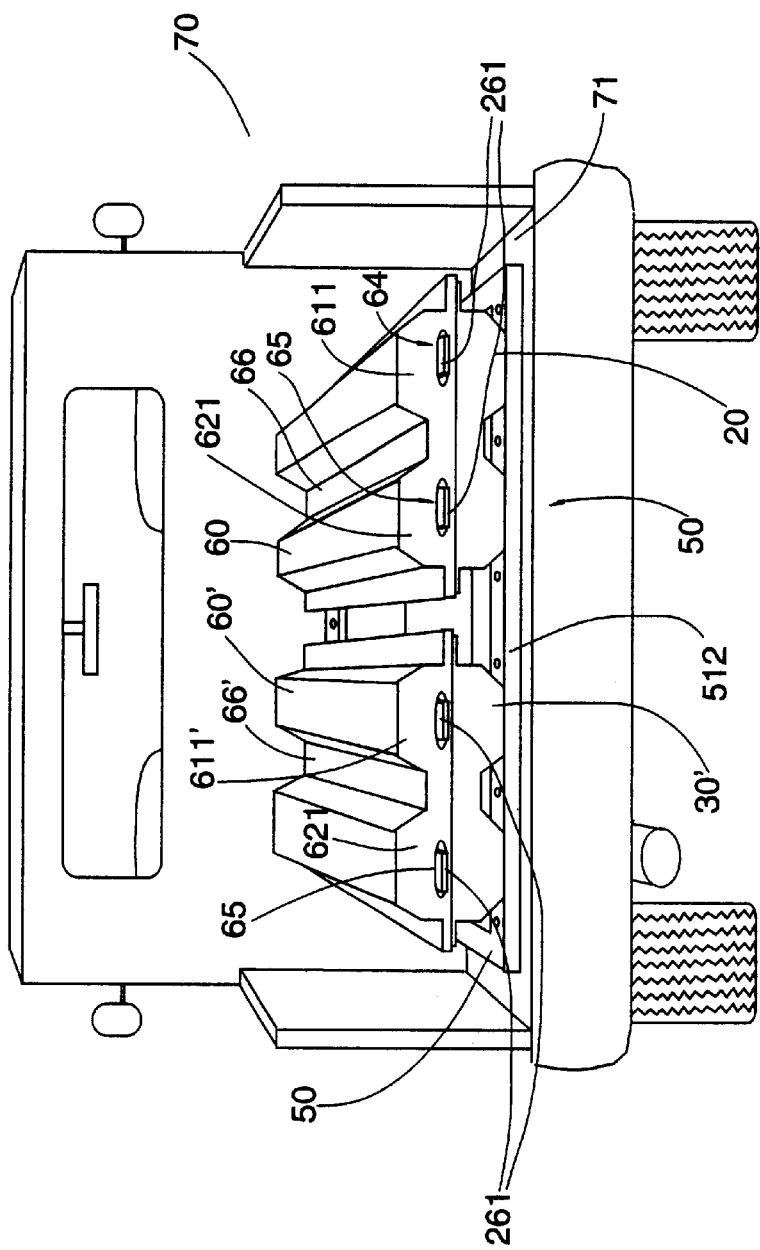
FIG. 2 is rear perspective view of the portable cylinder carrier arrangement according to the above preferred embodiment of the present invention, showing the placement of the portable cylinder carrier arrangement installed on the flatbed of a truck.
Figure 3:
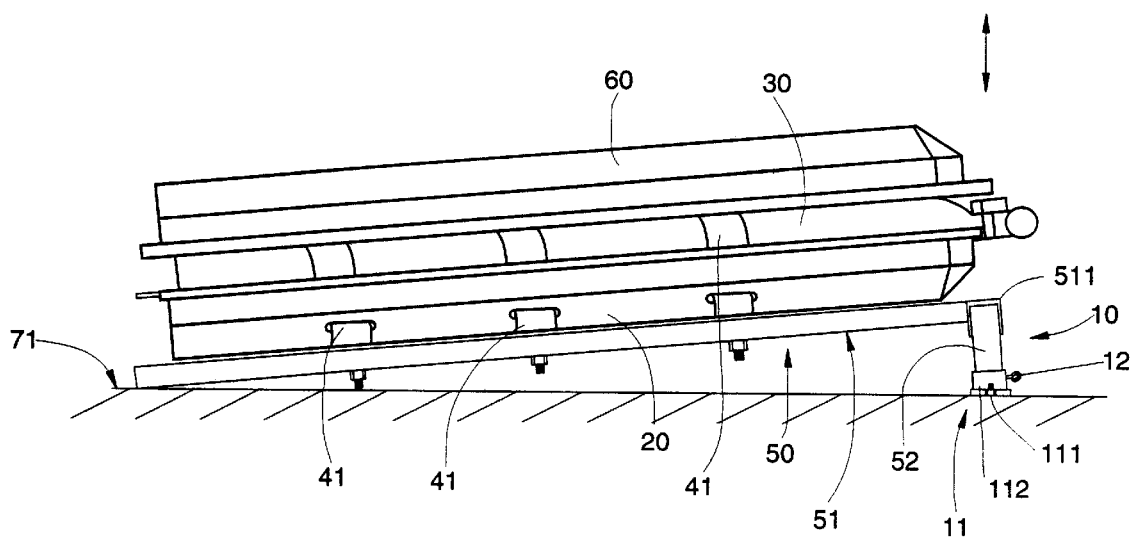
FIG. 3 is a side view of the portable cylinder carrier arrangement according to the above preferred embodiment of the present invention.

According to the preferred embodiment of the present invention, as shown in FIGS. 1 to 3, the carrier shell 20 has a W-shaped cross section that further defines a second receiving cavity 22 aligned in parallel with the receiving cavity 21 for totally receiving two gas cylinders 30, wherein the carrier shell 20 further comprises a separation wall 23 extended between the two receiving cavities 21 and 22. The carrier shell 20 can be made of stainless steel, polyurethane or ABS plastic material by welding or molding the material into an one-piece structure. Each of the receiving cavities 21, 22 is surrounded by a bottom wall 24, a front wall 25, a rear wall 26, and two side walls 27, 28.

The carrier shell 20 as shown in the left side of FIG. 1 has a collar notch 251 provided at a top edge of the front wall 25 of each of the receiving cavities 21, 22 so as to enable a cylinder head 31 of the gas cylinder 30 frontwardly extending outside the carrier shell 20.

Of course, if the carrier shell 20 is long enough to receive the entire gas cylinder 30, such as an alternative carrier shell 20' shown in the right side of FIG. 1, the collar notch 251 can thus be omitted and a U-shaped handle 29' is further integrally connected to the front side of the separation wall 23' thereof for easy carrying.

The restraining means 40 comprising at least a holding strap 41 provided within each of the receiving cavities 21, 22 for tightening up the respective gas cylinder 30 so as to firmly restrain the gas cylinder 30 in position. According to the preferred embodiment of the present invention, the two sides walls 27, 28 of each receiving cavity 21, 22 provide a plurality pair of strap holes 271, 281. Two or more holding straps 41 are spacedly placed below the bottom wall 24 of each of the receiving cavities 21, 22 of the carrier shell 20, wherein two ends of each of the holding straps 41 are respectively penetrating into the corresponding receiving cavity 21, 22 through the respective pair of strap holes 271, 281. A hook fastener and a loop fastener are respectively connected to the two ends of each holding strap 41, so that simply enwrapping the holding strap 41 around the gas cylinder 30 and connecting the loop and hook fasteners together can firmly secure the gas cylinder 30 in position inside the receiving cavity 21, 22.

As shown in FIG. 1, the supporter means 10 comprises two base supporters 11, each comprising a securing base 111 adapted to permanently affix onto the storing surface and a tubular supporting head 112 inclinedly extended from the securing base 111 upwardly. A locking through hole 113 is transversely provided on the supporting head 112. Each base supporter 11 further comprises a locking bolt 12 that is adapted for penetrating through the locking though hole 113 and can be fastened by a locking nut 13.

As shown in FIG. 1, the mounting seat 50 comprises a seat frame 51 on which the two carrier shells 20, 20' are fastened thereto by screws or bolts 511, and two mounting arms 52 respectively connected to two front ends of the seat frame 51 for mounting to the two base supporters 11 respectively.

The seat frame 51 comprises a front bar 511, a rear bar 512, and four supporting bars 513, 514, 515, 516 integrally connected between the front bar 511 and the rear bar 512 in parallel and spaced manner. Each of the supporting bars 513, 514, 515, 516 has a plurality of threaded holes 54 provided thereon. Each of the bottom walls 24, 24' of the two carrier shells 20, 20' is provided with a plurality of securing holes 56. Accordingly, the two carrier shells 20, 20' can be mounted on the seat frame 51 by securing the bottom walls 24, 24' with the respective supporting bars 513, 514, 515, 516 by screwing flat head screws or bolts 53 to the threaded holes 54 on the supporting bars 513, 514, 515, 516 via the securing holes 56 on the bottom walls 24, 24'.

Each of the mounting arms 52 comprises a vertical bar 521 and an elongated horizontal bar 522 perpendicularly connected to form a L-shaped arm. The vertical bar 521 which has a through hole 523 is arranged to detachably insert into the supporting head 112. The mounting arm 52 can be locked to the respective base supporter 11 by penetrating the locking bolt 12 through the locking through hole 113 as well as the through hole 23. The connection between the vertical bar 521 and the supporting head 112 can be further fastened by screwing the locking nut 13 with the locking bolt 12.

The front bar 511 of the seat frame 51 is a hollow bar for inserting the two horizontal bars 522 of the two mounting arms 52. On bottom of the front bar 511, a plurality of penetrating holes 517 are spacedly provided at two end portions of the front bar 511 for selectively connecting the front bar 511 with the two horizontal bars 522 by two pairs of screws 61 by pressing the two horizontal bars 522 against the inside of the front bar. Therefore, the distance between the two base supporters 11 can be adjusted according to the surrounding conditions.

Figure 7:
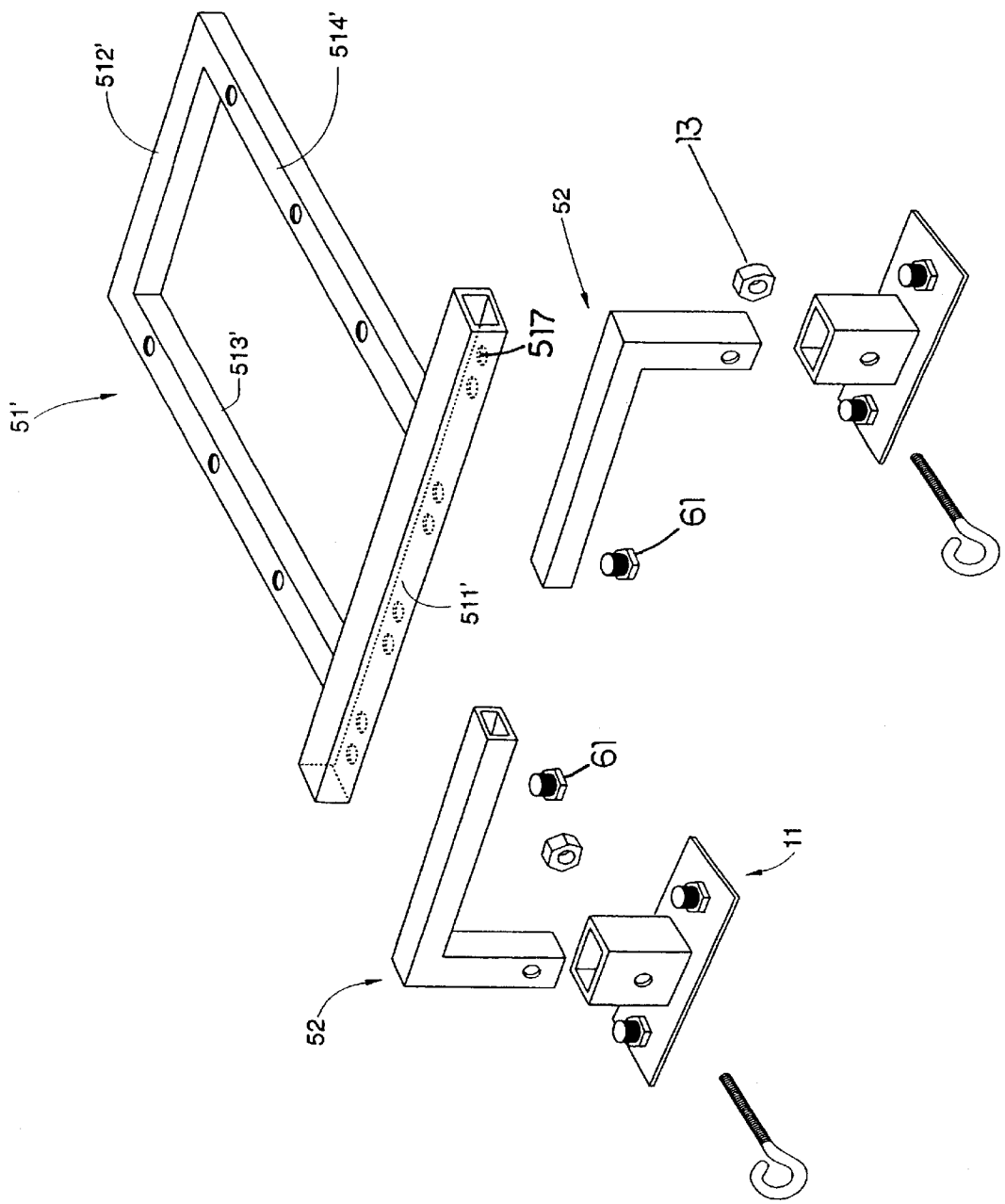
FIG. 7 is an exploded perspective view of an alternative mode of the mounting seat of the portable cylinder carrier arrangement according to the above preferred embodiment of the present invention.

As shown in FIG. 7, a modified seat frame 51' is illustrated, which comprises a shorter front bar 511' and rear bar 512', and only two supporting bars 513', 514' perpendicularly extended between two ends of the rear bar 512' and front bar 511'. Such seat frame 51' shown in FIG. 7 is specifically designed for limited space to merely affix and support one carrier shell 20 or 20'.

As shown in FIGS. 1 to 5, in order to further protect the gas cylinders fastened in the receiving cavities 21, 22, the portable cylinder carrier arrangement of the present invention further comprises a cover shell 60 adapted for covering each carrier shell 20 so as to protect the gas cylinders 30 stored therein from direct impact and also to lock up the gas cylinders 30 from being stolen.

Figure 5:
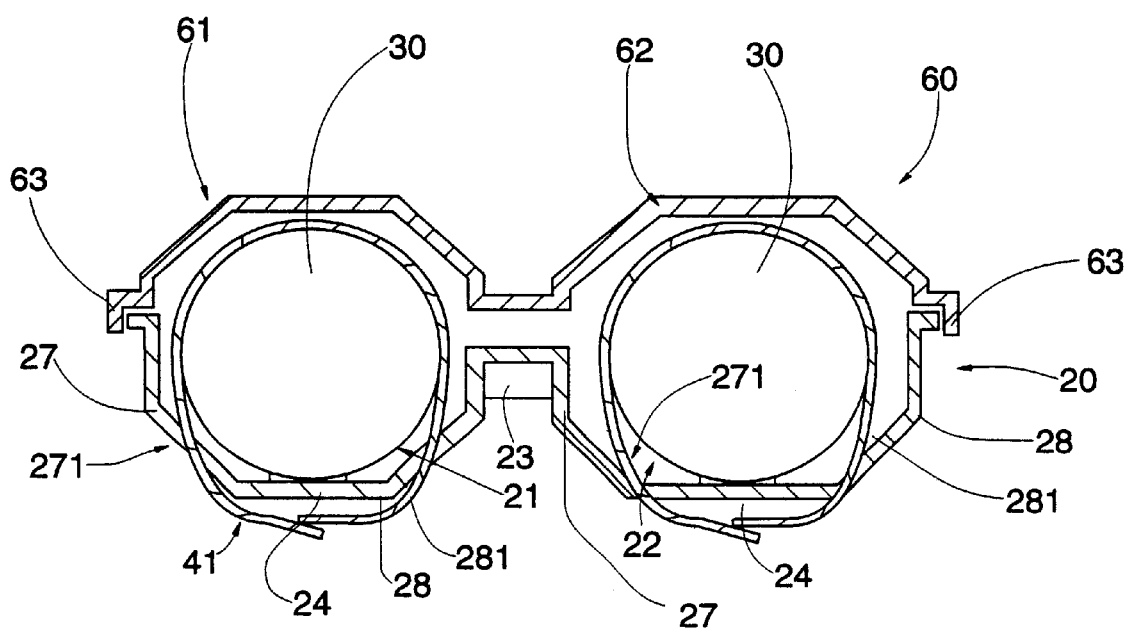
FIG. 5 is a sectional view of the portable cylinder carrier arrangement according to the above preferred embodiment of the present invention.

As shown in FIG. 1, the cover shell 60 or 60' basically is shaped and constructed identical to the carrier shell 20 or 20' so that each cover shell 60 also has two covering cavities 61, 62 (as shown in FIG. 5) positioned corresponding to the two receiving cavities 21, 22 of the carrier shell 20 so as to fittidly cover the upper half of the gas cylinders 30 tightened in the two receiving cavities 21, 22.

As shown in FIGS. 1 and 5, the cover shell 60 further has a surrounding lip 63 extended peripherally and downwardly along the circumferential side of cover shell 60, so that when the cover shell 60 is coaxially displaced on the carrier shell 20, the surrounding lip 63 will surround the circumferential sides of the carrier shell 20. In order to efficiently lock up the carrier shell 20 and the cover shell 60 without increasing the construction cost, as shown in FIG. 2, two mouth holes 64, 65 are respectively formed on the two rear walls 611, 621 of the covering cavities 61,62. Correspondingly, as shown in FIGS. 1 and 2, two rear lips 261 are respectively protruded rearwardly from the top sides of the two rear walls 26 of the carrier shell 20, wherein the two rear lips 261 are adapted to insert through the two mouth holes 64, 65 so as to connect the rear ends of the cover shell 60 and the carrier shell 20 together.

As shown in FIG. 1, at a front end of the separation wall 23 of the carrier shell 20, a carrier locking lip 231 having a carrier locking hole 232 provided thereon is formed. Relatively, at a front end of a separation wall 66 of the cover shell 60, a cover locking lip 661 having a cover locking hole 662 provided thereon is formed. Therefore, when the cover shell 60 covers the carrier hell 20, the user may first make sure that the two rear lips 261 are respectively inserted through the two mouth holes 64, 65, and then fasten a lock of any current kind through the carrier locking hole 232 and the cover locking hole 662 so as to lock up the carrier locking lip 231 and the cover locking lip 661. Accordingly, no one can take out the gas cylinders without unlocking and detaching the cover shell 60.

As shown in FIGS. 2 and 3, the two base supporters 11 of the supporter means 10 are permanently affixed on a bottom surface of a car's trunk or a flatbed 71 of a truck or pick-up 70 as shown in FIG. 2. Normally, the two base supporters 11 will not occupy much space when the vehicle is not transporting the gas cylinders. When the gas cylinders 30 need to be transported by the truck 70, the user may simply install the mounting seat 50 on the flatebed 71 of the truck 70 by means of the two base supporters 11. And then, two carrier shells 20, 20' can be screwed to inclinedly mount on the seat frame 51 of the mounting seat 50 for transporting the gas cylinders 30, 30' which are fastened by the holding straps 41 and laid on the receiving cavities 21, 22, 21', 22'. For further protection as mentioned above, two cover shells 60, 60' can be placed and locked on top of the two carrier shells 20, 20'. During the transportation, the portable cylinder carrier arrangement substantially prevents the gas cylinders stored therein from rolling around or sliding in the vehicle. It is worth mentioning that if a single type mounting seat 50 as shown in FIG. 7 is used, only a carrier shell 20 will be carried.

Figure 4:
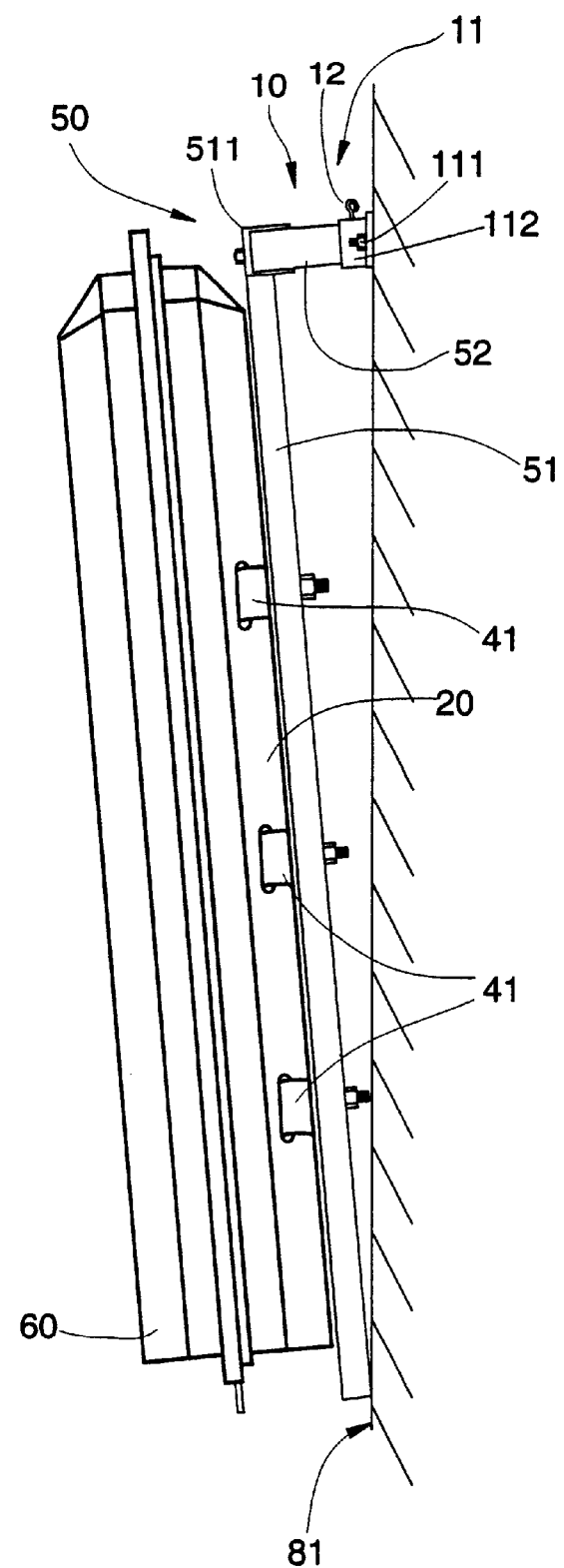
FIG. 4 is another side view of the portable cylinder carrier arrangement, which is arranged to be mounted on a wall according to the above preferred embodiment of the present invention.

As shown in FIG. 4, one more set of the two base supporters 11 of the supporter means 10 are suggested to install on a storage wall 81 of a storage area such as a store room or a garage of the user. Therefore, after usage of the gas cylinders 30 and back home, the user may simply detach the mounting seat 50 and the carrier shell 20 from the truck 70 and move them to the storage area. Moreover, the user can mount the mounting seat 50, the carrier shell 20 as well as the cover shell 60 to the base supporters 11 affixed on the storing wall 81 so as to hang them on the storing wall 81. It is a lot more organized than the traditional way of merely aligning the cylinders on the ground.

Figure 6:
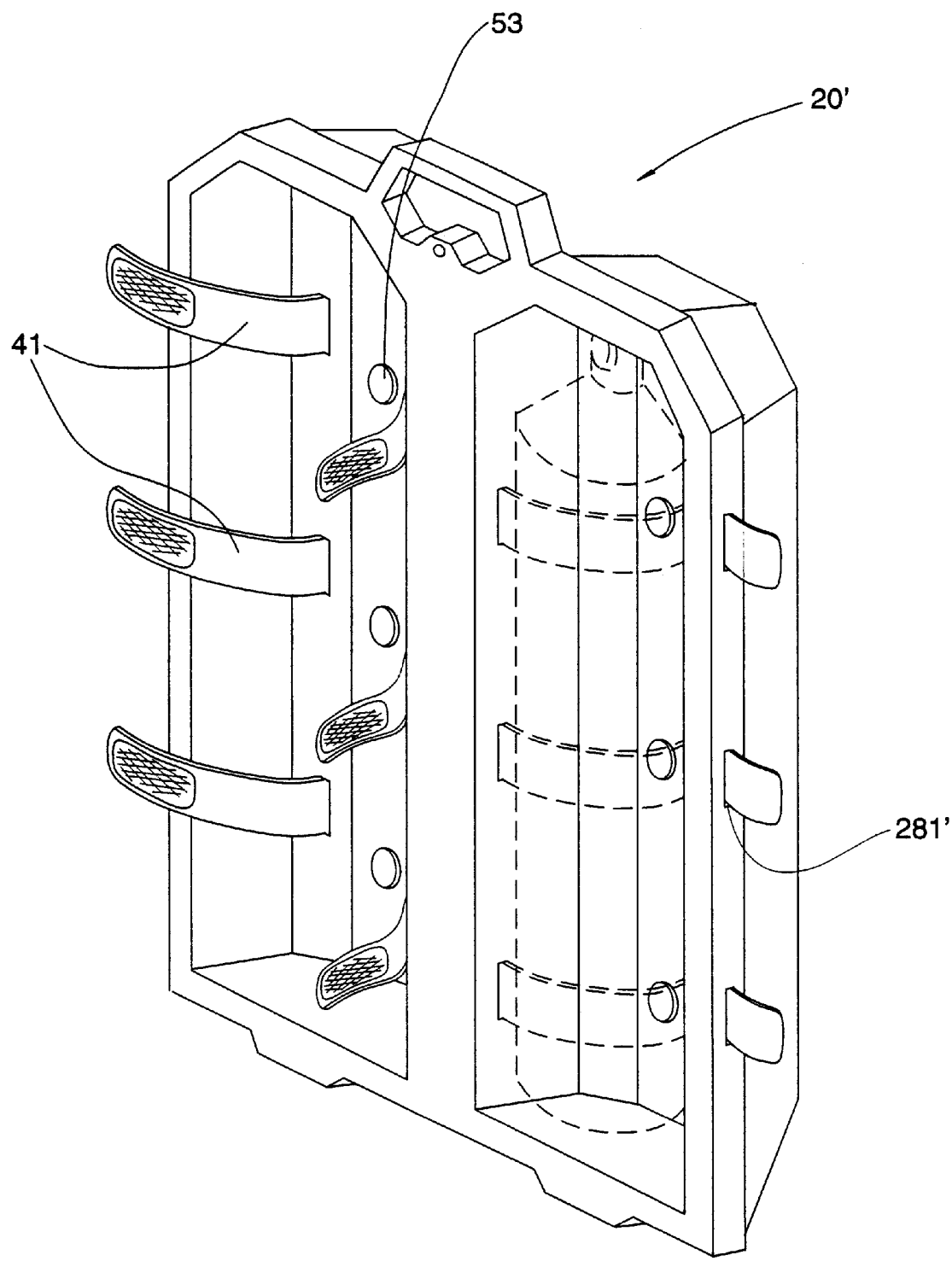
FIG. 6 is a perspective view of an alternative mode showing a carrier shell of the portable cylinder carrier arrangement directly affixed to a storing surface according to the above preferred embodiment of the present invention.

FIG. 6 illustrates an alternative way of storing the gas cylinders at home according to the present invention, wherein additional carrier shell 20' can be directly affixed on the storing wall 81 at home so that the gas cylinders can be fastened thereon for storage. As shown in FIG. 6, the carrier shell 20' is affixed on the storing wall 81 by screwing the flat head screws or bolts 53 on the storing wall 81 through the securing holes 56 respectively.

In view of the above, the portable cylinder carrier arrangement of the present invention is adapted for secure transport and storage of fire extinguishers or cylindrical gas cylinders, allowing for the carrier to be easily moved from a mounted storage position to a mounted transport position. It is easy to assemble, easy to mount, and easy to use and also can be used to orderly stack cylinders for storage while preventing sliding, or rolling of the cylinders.

What is claimed is:

1. A portable cylinder carrier arrangement for holding at least one gas cylinder to a storing surface for storing or transporting, comprising:

at least a carrier shell forming at least a receiving cavity for holding a gas cylinder therein, a supporter means for storing and transporting said carrier shell by firmly affixing said carrier shell on a storing surface, a restraining means for securing said gas cylinder in position inside said receiving cavity of said carrier shell, a mounting seat for securing said carrier shell to said supporter means;

wherein said carrier shell has a W-shaped cross section that further defines a second receiving cavity aligned in parallel with said receiving cavity for totally receiving two gas cylinders, wherein said carrier shell further comprises a separation wall extended between said two receiving cavities, and that each of said receiving cavities is surrounded by a bottom wall, a front wall, a rear wall, and two side walls; and wherein said carrier shell has a collar notch provided at a top edge of said front wall of each of said receiving cavities so as to enable a cylinder head of said gas cylinder frontwardly extending outside said carrier shell.

2. A portable cylinder carrier arrangement, as recited in claim 1, wherein said carrier shell further has a U-shaped handle integrally connected to a front side of said separation wall for easy carrying.

3. A portable cylinder carrier arrangement, as recited in claim 2, wherein said restraining means comprises at least a holding strap provided within each of said receiving cavities for tightening up said respective gas cylinder so as to firmly restrain said gas cylinder in position, wherein said two side walls of each of said receiving cavities provide a plurality pair of strap holes, and two or more holding straps are spacedly secured below said bottom wall of each of said receiving cavity of said carrier shell, wherein two ends of each of said holding straps are respectively penetrating into said corresponding receiving cavity through said respective pair of strap holes, wherein a hook fastener and a loop fastener are respectively connected to said two ends of each holding strap, so that simply enwrapping said holding strap around said gas cylinder and connecting said loop and hook fasteners together firmly secures said gas cylinder in position inside said receiving cavity.

4. A portable cylinder carrier arrangement, as recited in claim 3, wherein said supporter means comprises two base supporters each comprising a securing base adapted to permanently affix on said storing surface and a tubular supporting head inclinedly extended from said securing base upwardly, wherein a locking through hole is transversely provided on said supporting head, each of said base supporters further comprises a locking bolt that penetrates through said locking though hole and is fastened by a locking nut.

5. A portable cylinder carrier arrangement, as recited in claim 4, wherein said mounting seat comprises a seat frame on which said carrier shell is fastened thereto by screwing, two mounting arms respectively connected to two front ends of said seat frame for mounting to said two base supporters respectively.

6. A portable cylinder carrier arrangement, as recited in claim 5, wherein said seat frame comprises a front bar, a rear bar, and at least two supporting bars integrally connected between said front bar and said rear bar in parallel and spaced manner.

7. A portable cylinder carrier arrangement, as recited in claim 6, wherein each of said supporting bars having a plurality of threaded holes provided thereon, each of said bottom walls of said two carrier shells being provided with a plurality of securing holes, wherein said two carrier shells are mounted on said seat frame by securing said bottom walls with said respective supporting bars by screwing flat head screws to said threaded holes on said supporting bars via said securing holes on said bottom walls.

8. A portable cylinder carrier arrangement, as recited in claim 7, wherein each of said mounting arms comprises a vertical bar and an elongated horizontal bar perpendicularly connected to form a L-shaped arm.

9. A portable cylinder carrier arrangement, as recited in claim 8, wherein each of said mounting arms comprises a vertical bar and an elongated horizontal bar perpendicularly connected to form a L-shaped arm, wherein said vertical bar which has a through hole is arranged to detachably insert into said supporting head, said mounting arm is locked to said respective base supporter by penetrating said locking bolt through said locking through hole as well as said through hole, wherein said front bar of said seat frame is a hollow bar, which is open on each end, for inserting said two horizontal bars of said two mounting arms on each end, respectively, of said front bar, and that on bottom of said front bar, a plurality of penetrating holes are spacedly provided at two end portions of said front bar for selectively pressing said front bar with said two horizontal bars by a least two pairs of screws through said penetrating holes.

10. A portable cylinder carrier arrangement, as recited in claim 9, further comprising a cover shell for covering each carrier shell so as to protect said gas cylinder stored therein from direct impact, wherein each cover shell has two covering cavities positioned corresponding to said two receiving cavities of said carrier shell, and a surrounding lip extended peripherally and downwardly along said circumferential side of cover shell, so that when said cove shell is coaxially displaced on said carrier shell, said surrounding lip surrounds said circumferential sides of said carrier shell.

11. A portable cylinder carrier arrangement, as recited in claim 10, wherein two mouth holes are respectively formed on said two rear walls of said cover shell, and two rear lips are respectively protruded rearwardly from said top sides of said two rear walls of said carrier shell, wherein said two rear lips are adapted to insert through said two mouth holes so as to connect said rear ends of said cover shell and said carrier shell together.

12. A portable cylinder carrier arrangement, as recited in claim 11, wherein at a front end of said separation wall of said carrier shell, a carrier locking lip having a carrier locking hole provided thereon is formed, moreover at a front end of a separation wall of said cover shell, a cover locking lip having a cover locking hole provided thereon is formed.

13. A portable cylinder carrier arrangement for holding at least one gas cylinder to a storing surface for storing or transporting, comprising:

at least a carrier shell forming at least a receiving cavity for holding a gas cylinder therein, a supporter means for storing and transporting said carrier shell by firmly affixing said carrier shell on a storing surface, a restraining means for securing said gas cylinder in position inside said receiving cavity of said carrier shell, a mounting seat for securing said carrier shell to said supporter means;

wherein said carrier shell has a W-shaped cross section that further defines a second receiving cavity aligned in parallel with said receiving cavity for totally receiving two gas cylinders, wherein said carrier shell further comprises a separation wall extended between said two receiving cavities, and that each of said receiving cavities is surrounded by a bottom wall, a front wall, a rear wall, and two side walls;

wherein said restraining means comprises at least a holding strap provided within each of said receiving cavities for tightening up said respective gas cylinder so as to firmly restrain said gas cylinder in position; and wherein said two side walls of each of said receiving cavities provide a plurality pair of strap holes, and two or more holding straps are spacedly secured below said bottom wall of each of said receiving cavity of said carrier shell, wherein two ends of each of said holding straps are respectively penetrating into said corresponding receiving cavity through said respective pair of strap holes.

14. A portable cylinder carrier arrangement, as recited in claim 13, wherein a hook fastener and a loop fastener are respectively connected to said two ends of each holding strap, so that simply enwrapping said holding strap around said gas cylinder and connecting said loop and hook fasteners together firmly secures said gas cylinder in position inside said receiving cavity.

15. A portable cylinder carrier arrangement for holding at least one gas cylinder to a storing surface for storing or transporting, comprising:

at least a carrier shell forming at least a receiving cavity for holding a gas cylinder therein, a supporter means for storing and transporting said carrier shell by firmly affixing said carrier shell on a storing surface, a restraining means for securing said gas cylinder in position inside said receiving cavity of said carrier shell, a mounting seat for securing said carrier shell to said supporter means; and wherein said supporter means comprises two base supporters each comprising a securing base adapted to be permanently affixed on said storing surface and tubular supporting head inclinedly extended from said securing base upwardly, wherein a locking through hole is transversely provided on said supporting head, each of said base supporters further comprises a locking bolt that penetrates through said locking through hole and is fastened by a locking nut.

16. A portable cylinder carrier arrangement, as recited in claim 15, wherein said mounting seat comprises a seat frame on which said carrier shell is fastened thereto by screwing, two mounting arms respectively connected to two front ends of said seat frame for mounting to said two base supporters respectively.

17. A portable cylinder carrier arrangement, as recited in claim 16, wherein said seat frame comprises a front bar, a rear bar, and at least two supporting bars integrally connected between said front bar and said rear bar in parallel and spaced manner.

18. A portable cylinder carrier arrangement, as recited in claim 17, wherein each of said supporting bars having a plurality of threaded holes provided thereon, each of said bottom walls of said two carrier shells being provided with a plurality of securing holes, wherein said two carrier shells are mounted on said seat frame by securing said bottom walls with said respective supporting bars by screwing flat head screw to said threaded holes on said supporting bars via said securing holes on said bottom walls.

19. A portable cylinder carrier arrangement, as recited in claim 16, wherein each of said mounting arms comprises a vertical bar and an elongated horizontal bar perpendicularly connected to form a L-shaped arm.

20. A portable cylinder carrier arrangement, as recited in claim 18, wherein each of said mounting arms comprises a vertical bar and an elongated horizontal bar perpendicularly connected to form a L-shaped arm, wherein said vertical bar which has a through hole is arranged to detachably insert into said supporting head, said mounting arm is locked to said respective base supporter by penetrating said locking bolt through said locking through hole as well a said through hole, wherein said front bar of said seat frame is a hollow bar, which is open on each end, for inserting said two horizontal bars of said two mounting arms on each end, respectively, of said front bar, and that on bottom of said front bar, a plurality of penetrating holes are spacedly provided at two end portions of said front bar for selectively pressing said front bar with said two horizontal bars by at least two pairs of screws through said penetrating holes.

21. A portable cylinder carrier arrangement, as recited in claim 18, wherein each of said mounting arms comprises a vertical bar and an elongated horizontal bar perpendicularly connected to form a L-shaped arm.

22. A portable cylinder carrier arrangement, as recited in claim 21, wherein each of said mounting arms comprises a vertical bar and an elongated horizontal bar perpendicularly connected to form a L-shaped arm, wherein said vertical bar which has a through hole is arranged to detachably insert into said supporting head, said mounting arm is locked to said respective base supporter by penetrating said locking bolt through said locking though hole as well as said through hole, wherein said front bar of said seat frame is a hollow bar, which is open on each end, for inserting said two horizontal bars of said two mounting arms on each end, respectively, of said front bar, and that on bottom of said front bar, a plurality of penetrating holes are spacedly provided at two end portions of said front bar for selectively pressing said front bar with said two horizontal bars by at least two pairs of screws through said penetrating holes.

23. A portable cylinder carrier arrangement for holding at least one gas cylinder to a storing surface for storing or transporting, comprising:

at least a carrier shell forming at least a receiving cavity for holding a gas cylinder therein, a supporter means for storing and transporting said carrier shell by firmly affixing said carrier shell on a storing surface, a restraining means for securing said gas cylinder in position inside said receiving cavity of said carrier shell, a mounting seat for securing said carrier shell to said supporter means;

a cover shell for covering each carrier shell so as to protect said gas cylinders stored therein from direct impact; and wherein each cover shell has two covering cavities positioned corresponding to two of said receiving cavities of said carrier shell, and a surrounding lip extended peripherally and downwardly along said circumferential side of said cover shell, so that when said cover shell is coaxially displaced on said carrier shell, said surrounding lip surrounds said circumferential sides of said carrier shell.

24. A portable cylinder carrier arrangement, as recited in claim 23, wherein two mouth holes are respectively formed on said two rear walls of said cover shell and two rear lips are respectively protruded rearwardly from said top sides of said two rear walls of said carrier shell, wherein said two rear lips are adapted to insert through said two mouth holes so as to connect said rear ends of said cover shell and said carrier shell together.

25. A portable cylinder carrier arrangement, as recited in claim 24, wherein at a front end of said separation wall of said carrier shell, a carrier locking lip having a carrier locking hole provided thereon is formed, moreover at a front end of a separation wall of said cover shell, a cover locking lip having a cover locking hole provided thereon is formed.

26. A portable cylinder carrier arrangement for holding at least one gas cylinder to a storing surface for storing or transporting, comprising:

at least a carrier shell forming at least a receiving cavity for holding a gas cylinder therein, a supporter means for storing and transporting said carrier shell by firmly affixing said carrier shell on a storing surface, a restraining means for securing said gas cylinder in position inside said receiving cavity of said carrier shell, a mounting seat for securing said carrier shell to said supporter means;

a cover shell for covering each carrier shell so as to protect said gas cylinders stored therein from direct impact; and wherein two mouth holes are respectively formed on said two rear walls of said cover shell, and two rear lips are respectively protruded rearwardly from said top sides of said two rear walls of said carrier sell, wherein said two rear lips are adapted to insert through said two mouth holes so as to connect said rear ends of said cover shell and said carrier shell together.

27. A portable cylinder carrier arrangement, as recited in claim 26, wherein at a front end of said separation wall of said carrier shell, a carrier locking lip having a carrier locking hole provided thereon in formed, moreover at a front end of a separation wall of said cover shell, a cover locking lip having a cover locking hole provided thereon is formed.

28. A portable cylinder carrier arrangement for holding at least one gas cylinder to a storing surface for storing or transporting, comprising:

at least a carrier shell forming at least a receiving cavity for holding a gas cylinder therein, a supporter means for storing and transporting said carrier shell by firmly affixing said carrier shell on a storing surface, a restraining means for securing said gas cylinder in position inside said receiving cavity of said carrier shell, a mounting seat for securing said carrier shell to said supporter means;

wherein said carrier shell has a W-shaped cross section that further defines a second receiving cavity aligned in parallel with said receiving cavity for totally receiving two gas cylinders, wherein said carrier shell further comprises a separation wall extended between said two receiving cavities, and that each of said receiving cavities is surrounded by a bottom wall, a front wall, a rear wall, and two side walls;

a cover shell for covering each carrier shell so as to protect said gas cylinders stored therein from direct impact; and wherein each cover shell has two covering cavities positioned corresponding to said two receiving cavities of said carrier shell, and a surrounding lip extended peripherally and downwardly along said circumferential side of said cover shell, so that when said cover shell is coaxially displaced on said carrier shell, said surrounding lip surrounds said circumferential sides of said carrier shell.

29. A portable cylinder carrier arrangement, as recited in claim 28, wherein two mouth holes are respectively formed on said two rear walls of said covering, and two rear lips are respectively protruded rearwardly from said two rear walls of said cover shell, and two rear lips are respectively formed on said two rear walls of said carrier shell, wherein said two rear lips are adapted to insert through said two mouth holes so as to connect said rear ends of said cover shell and said carrier shell together.

30. A portable cylinder carrier arrangement, as recited in claim 29, wherein at a front end of said separation wall of said carrier shell, a carrier locking lip having a carrier locking hole provided thereon is formed, moreover at a front end of a separation wall of said cover shell, a cover locking lip having a cover locking hole provided thereon is formed.

31. A portable cylinder carrier arrangement for holding at least one gas cylinder to a storing surface for storing or transporting, comprising:

at least a carrier shell forming at least a receiving cavity for holding a gas cylinder therein, a supporter means for storing and transporting said carrier shell by firmly affixing said carrier shell on a storing surface, a restraining means for securing said gas cylinder in position inside said receiving cavity of said carrier shell, a mounting seat for securing said carrier shell to said supporter means;

wherein said carrier shell has a W-shaped cross section that further defines a second receiving cavity aligned in parallel with said receiving cavity for totally receiving two gas cylinders, wherein said carrier shell further comprises a separation wall extended between said two receiving cavities, and that each of said receiving cavities is surrounded by a bottom wall, a front wall, a rear wall, and two side walls;

a cover shell for covering each carrier shell so as to protect said gas cylinders stored therein from direct impact; and;

wherein two mouth holes are respectively formed on said two rear walls of said cover shell, and two rear lips are respectively protruded rearwardly form said top sides of said two rear walls of said carrier shell, wherein said two rear walls of said carrier shell, wherein said two rear lips are adapted to insert through said two mouth holes so as to connect said rear ends of said cover shell and said carrier shell together.

32. A portable cylinder carrier arrangement, as recited in claim 31, wherein at a front end of said separation wall of said carrier shell, a carrier locking lip having a carrier locking hole provided thereon is formed, moreover at a front end of a separation wall of said cover shell, a cover locking lip having a cover locking hole provided thereon is formed.

33. A portable cylinder carrier arrangement for holding at least one gas cylinder to a storing surface for storing or transporting, comprising:

at least a carrier shell forming at least a receiving cavity for holding a gas cylinder therein, a restraining means for securing said gas cylinder in position inside said receiving cavity of said carrier shell, and a supporter means for storing and transporting said carrier shell by firmly affixing said carrier shell on a storing surface;

wherein said carrier shell has a W-shaped cross section that further defines a second receiving cavity aligned in parallel with said receiving cavity for totally receiving two gas cylinders, wherein said carrier shell further comprises a separation wall extended between said two receiving cavities, and that each of said receiving cavities is surrounded by a bottom wall, a front wall, a rear wall, and two side walls; and wherein said carrier shell has a collar notch provided at a top edge of said front wall of each of said receiving cavities so as to enable a cylinder head of said gas cylinder frontwardly extending outside said carrier shell.

34. A portable cylinder carrier arrangement, as recited in claim 33, wherein said carrier shell further has a U-shaped handle integrally connected to a front side of said separation wall for easy carrying.

35. A portable cylinder carrier arrangement for holding at least one gas cylinder to a storing surface for storing or transporting, comprising:

at least a carrier shell forming at least a receiving cavity for holding a gas cylinder therein, a restraining means for securing said gas cylinder in position inside said receiving cavity of said carrier shell, and a supporter means for firmly affixing said carrier shell on a storing surface for storing or transporting;

wherein said carrier shell has a W-shaped cross section that further defines a second receiving cavity aligned in parallel with said receiving cavity for totally receiving two gas cylinders, wherein said carrier shell further comprises a separation wall extended between said two receiving cavities, and that each of said receiving cavities is surrounded by a bottom wall, a front wall, a rear wall, and two side walls;

wherein said restraining means comprises at least a holding strap provided within each of said receiving cavities for tightening up said respective gas cylinders so as to firmly restrain said gas cylinders in position; and wherein said two side walls of each of said receiving cavities provide a plurality pair of strap holes, and two or more holding straps are spacedly secured below said bottom wall of each of said receiving cavity of said carrier shell, wherein two ends of each of said holding straps are respectively penetrating into said corresponding receiving cavity through said respective pair of strap holes.

36. A portable cylinder carrier arrangement, as recited in claim 35, wherein a hook fastener and a loop fastener are respectively connected to said two ends of each holding strap, so that by simply enwrapping said holding strap around said gas cylinder and connecting said loop and hook fasteners together firmly secure said gas cylinder in position inside said receiving cavity.

37. A portable cylinder carrier arrangement, as recited in claim 36, further comprising a cover shell for covering each carrier shell so as to protect said gas cylinders stored therein from direct impact, wherein each cover shell has two covering cavities positioned corresponding to said two receiving cavities of said carrier shell, and a surrounding lip extended peripherally and downwardly along said circumferential side of said cover shell, so that when said cover shell is coaxially displaced on said carrier shell, said surrounding lip surrounds said circumferential sides of said carrier shell.

38. A portable cylinder carrier arrangement, as recited in claim 37, wherein two mouth holes are respectively formed on said two rear walls of said cover shell, and two rear lips are respectively protruded rearwardly from said top sides of said two rear walls of said carrier shell, wherein said two rear lips are adapted to insert through said two mouth holes so as to connect said rear ends of said cover shell and said carrier shell together.

39. A portable cylinder carrier arrangement, as recited in claim 38, wherein at a front end of said separation wall of said carrier shell, a carrier locking lip having a carrier locking hole provided thereon is formed, moreover at a front end of a separation wall of said cover shell, a cover locking lip having a cover locking hole provided thereon is formed.

40. A portable cylinder carrier arrangement, as recited in claim 39, wherein said carrier shell further has a U-shaped handle integrally connected to a front side of said separation wall for easy carrying.

* * * * *